3,212,937
METHOD OF PREPARING A FUEL CELL ELECTRODE
Gerhardt Talvenheimo, Chester, Pa., assignor, by direct and mesne assignments, of one-half to Air Products and Chemicals, Inc., Philadelphia, Pa., a corporation of Delaware, and one-half to Northern Natural Gas Company, Omaha, Nebr., a corporation of Delaware
No Drawing. Filed July 25, 1961, Ser. No. 126,495
12 Claims. (Cl. 136—122)

This invention relates to a method for making a rigid, porous carbon body suitable as a support or matrix for catalytic material in the formation of a fuel cell electrode.

Catalytic electrodes of the type embraced within the scope of the present invention find particular application as the active electrode elements of fuel cells for the electro-chemical oxidation of fuels, such as, hydrogen, hydrocarbons, alcohols, carbonyl compounds and the like to produce usable electrical energy.

In the formation of rigid, porous carbon supports or matrices for utilization as either a catalytic fuel electrode or oxygen electrode of a fuel cell it is a known practice to employ either non-porous baked carbon or graphite or combinations thereof as starting constituents, and to mould or otherwise form a mix of such constituents into a rigid mass having an acquired structural porosity. Such supports do not provide the high surface area characteristics desirable in fuel cell electrodes since the surface properties of the porous carbon mass are a function of the external surface properties of the non-porous carbon particles making up the mass. Thus, the total surface area of electrodes so formed is not much, if any, greater than that of the geometric surface areas of all the particles, assuming that some additional surface area is derived from intraparticle cracks, fissures and other surface irregularities.

It has been found that such electrodes generally have a maximum surface area somewhat less than one m.$^2$/g., which is considered much too low for the purpose of affording an adequate catalytically active surface for promoting the desired electrochemical reactions.

To catalytically activate the electrode and to provide a substantial increase in surface area, various techniques have been employed, one such being disclosed in copending application, Serial No. 67,521, of James E. McEvoy and Harold Shalit, for improvements in a Fuel Cell Electrode, filed November 7, 1960, now Patent No. 3,097,974. The disclosed technique involves the steps of: adsorbing a catalytic noble metal compound on activated carbon powder of finer than 200 mesh, U.S. Standard; forming a suspension of the noble metal impregnated carbon in a suitable liquid carrier, such as acetone; and introducing the suspension into a thin porous electrode matrix or support having an average pore diameter substantially greater than the particle-size range of the activated carbon powder, followed by drying at substantially ambient temperature.

While the foregoing technique produced an improved catalytic fuel cell electrode, there was an observed tendency for the finer particles of catalyst containing activated carbon to flake off or fall out of the relatively large pores at the surface of the electrode matrix. To overcome such tendency the dried electrode is coated with a semi-sealant, such as silicon polymers, polymeric fluorocarbons, polystyrenes and other organic polymers, in a suitable solvent. For example, the coating may comprise a polymethylmethacrylate in acetone. Such coatings are considered semi-sealant in the sense that they bond the finely divided powder within the relatively large pores of the matrix.

In accordance with the invention a high surface area, porous carbon electrode or electrode matrix is formed wholly or at least in substantial part from activated carbon powder in the size range of all through 200 mesh and at least 90% through 300 mesh, both U.S. Standard. The activated carbon has a bulk density of about 0.40 g./cc., an average particle size of about 40–50 microns, and a surface area of about 800–1000 m.$^2$/g. It may, for example, comprise a wood charcoal activated with heat and steam, then acid and water washed so that the final product contains less than a few percent of water extractables and is relatively low in chloride, iron, copper, sulphides, calcium, etc.

Where the activated carbon is admixed with other carbonaceous material it is incorporated within the final matrix structure as an intrinsic part thereof, being well distributed throughout the entire mass, and therefore not requiring a surface sealant.

The carbonaceous material employed in admixture with activated carbon may be a porous baked carbon or graphite obtained commercially in any of several forms, such as a prepared brick or cylinder. In order to combine the baked carbon or graphite with the activated carbon powder the solid carbon or graphite mass is pulverized to a size range somewhat coarser than the activated carbon. In a preferred mode of carrying out the invention the baked carbon was pulverized so that the composite powder, as determined by wet sieve analysis, has a size distribution of about 25–30 wt. percent on 100 mesh, 45–50 wt. percent on 200 mesh, 10–15 wt. percent on 325 mesh, and 10–15 wt. percent through 325 mesh, all U.S. Standard. The porous graphite was pulverized to a size all through 20 mesh.

The pulverized material is admixed with a heavy liquid binder, such as residual hydrocarbon oil, to form a raw or green mix capable of being moulded or extruded to the desired electrode shape. For activated carbon alone 120–160 wt. percent of binder is employed. For activated carbon in admixture with either baked carbon or graphite 80–100 wt. percent of binder is used. These are in contrast to the 20–30 wt. percent found suitable for either baked carbon or graphite alone.

Thus, in accordance with the present invention, the heavy liquid binder may comprise 45–62 wt. percent of the total raw mix, and preferably comprises 55–62 wt. percent of the total raw mix when activated carbon is used alone and 50–55 wt. percent of the total raw mix when the activated carbon is used in admixture with either baked carbon or graphite.

The raw mix is compressed at about 1500–2500 p.s.i.g., preferably about 2000 p.s.i.g., into a solid mass having the desired electrode shape or a shape from which the desired electrodes may be obtained by cutting. The preformed mass is then baked in a reducing atmosphere, such as a hydrocarbon atmosphere, in a temperature range of about 150–250° C., preferably about 200° C., for a period of about 2–3 days, such as about 60–70 hours. Final baking is then accomplished by gradual periodic increases in temperature, such as a 100° C. increase each half hour, until a temperature of about 1000° C. or slightly higher is reached. The elevated temperature is then held substantially constant for a period of at least about one hour, followed by cooling at ambient (i.e., atmospheric) temperature.

The finished product is characterized by substantial physical strength and desirable porosity and is ready for use as an electrode matrix or support. When the material was formed as a stock bar it had sufficient strength to enable its being cut by an abrasive saw into relatively thin plates or discs 1–4 mm. in thickness without crumbling or breaking. The thin electrode supports were strong enough to withstand the handling and pressures incident to their being catalytically activated by impregnation or coating thereof with catalytic materials.

Electrode supports prepared in accordance with the foregoing technique were subjected to analyses and tests as set forth in the following table of data.

*Table 1.—Starting materials*

(1) *Activated carbon powder:*
   Specification.—Wood charcoal prepared by activation with heat and steam, followed by strong mineral acid wash and water wash. Contains less than 3% water extractables and is low in chlorides, iron, copper, sulphides, calcium, etc.
   Particle size.—all through 200–90% through 300 mesh
   (U.S. Standard); Ave. dia.: 0.0016–0.0020 in. (40–50 microns)
   Bulk density 25 #/cu. ft. (0.40 g./cc.)
   Surface area 90–110 acres/# (800–1000 m.$^2$/g.)
(2) *Porous baked carbon (solid form):*
   Specification.—
      Bulk density (#/cu. ft.) _____ 64
      Strength (#/sq. in.):
         Tensile _____ 190
         Compressive _____ 850
         Flexural _____ 600
      Porosity (percent) _____ 48
      Ave. pore dia. 0.0013 in. (33 microns).
(3) *Porous graphite (solid form):*
   Specification.—
      Bulk density (#/cu. ft.) _____ 64
      Strength (#/sq. in.):
         Tensile _____ 60
         Compressive _____ 310
         Flexural _____ 48
      Porosity (percent) _____ 48
      Ave. por dia. 0.0055 in. (140 microns).
(4) A 50–50 mixture, by wt., of materials 1 and 2.
(5) A 50–50 mixture, by wt., of materials 1 and 3.
(6) *Charcoal powder:*
   Specification.—
      Lump wood charcoal
      Bulk density 18.1 #/cu. ft. (0.29 g./cc.)
      Particle size: same as for material 1.
      Surface area: same as for material 1.

| | Wt. Percent Binder | Vol. Percent Porosity | Wt. Percent Absorption | Apparent Density | Ave. Pore Dia., μ | Surface Area, m.$^2$/g. |
|---|---|---|---|---|---|---|
| 1 | 164 | 64.4 | 113.5 | 0.567 | 2.9 | 150–350 |
| 2 | 25 | 44.0 | 45.9 | 0.958 | 33.0 | 1 |
| 3 | 25 | 48.7 | 56.9 | 0.856 | 50.0 | 1 |
| 4 | 94 | 49.0 | 55.6 | 0.881 | 2.8 | 75–175 |
| 5 | 94 | 42.3 | 43.5 | 0.973 | 3.2 | 75–175 |
| 6 | 118 | 53.6 | 72.2 | 0.742 | 4.2 | |

From the above data it is evident that activated carbons, alone or in admixture with non-porous carbon or graphite, may be shaped into thin electrode matrices or supports of substantial physical strength, and may possess properties similar to those derived from unactivated carbons, while retaining a considerable amount of their original surface area.

After the composite matrix is completed, it may be treated by any of several known techniques to incorporate therein, by impregnation or otherwise, catalytic materials, such as noble metals from the group consisting of platinum and palladium, which will render the electrode suitable for use as a catalytic anode or cathode of a fuel cell. Or, for example, it may be treated advantageously in accordance with the techniques set forth in copending application Serial No. 67,521 of James E. McEvoy and Harold Shalit, for improvement in a Fuel Cell Electrode, filed November 7, 1960, now Patent No. 3,097,974.

Obviously many modifications and variations of the invention as hereinbefore set forth may be made without departing from the spirit and scope thereof, and therefore only such limitations should be imposed as are indicated in the appended claims.

What is claimed is:

1. The method of making a porous matrix fuel cell electrode which comprises the steps of:
   (a) forming a raw mix of pulverized carbonaceous material comprising high surface area, activated carbon powder and a heavy residual hydrocarbon oil and constituting about 80–160 wt. percent of the pulverized carbonaceous material,
   (b) compressing said raw mix to the desired matrix shape by applied pressure of about 1500–2500 p.s.i.g.,
   (c) baking said raw mix in a reducing, hydrocarbon atmosphere at a temperature in the range of about 150–250° C. for a period of about 2–3 days,
   (d) final baking said baked mix by gradual periodic increases in temperature until an elevated temperature of about 1000° C. is attained,
   (e) holding said elevated temperature substantially constant for a period of at least one hour,
   (f) and permitting said final baked mix to cool at ambient temperature.

2. The method as in claim 1, in which said activated carbon powder has a bulk density of about 25 lb./cu. ft., an average particle size of about 0.0016–0.0020 in., and a surface area of about 90–110 acres/lbs.

3. The method as in claim 2, in which said raw mix comprises particles, coarser than said activated carbon powder, of repulverized solid baked carbon having a bulk density of about 64 lb./cu. ft., a surface area of less than 0.112 acre/lb., a porosity of about 48% and an average pore diameter of about 0.0013 inch.

4. The method as in claim 3, in which said mix comprises equal amounts by weight of said activated carbon and said baked carbon.

5. The method as in claim 2, in which said raw mix comprises particles, coarser than said activaten carbon powder, of repulverized solid graphite having a bulk density of about 64 lb./cu. ft., a surface area of less than 0.112 acres/lb., a porosity of about 48% and an average pore diameter of about 0.0055 inch.

6. The method as in claim 5, in which said mix comprises equal amounts by weight of said activated carbon and said graphite.

7. The method as in claim 2, in which said activated carbon powder is of a particle size, all passing through 200 mesh—90% passing through 300 mesh (U.S. Standard).

8. The method as in claim 2, in which said activated carbon powder is the sole pulverized carbonaceous constituent of said raw mix, and said heavy residual hydrocarbon oil constitutes about 120–160 wt. percent of said activated carbon.

9. The method as in claim 3, in which said heavy residual hydrocarbon oil constitutes about 80–110 wt. percent of said pulverized carbonaceous material.

10. The method as in claim 5, in which said heavy residual hydrocarbon oil constitutes about 80–110 wt. percent of said pulverized carbonaceous material.

11. The method as in claim 1, in which said pressure in step (b) is about 2000 p.s.i.g., said baking temperature and baking period in step (c) are about 200° C. and about 65 hrs., respectively, and said period for holding a substantially constant elevated temperature in step (e) is about 1 hr.

12. The method as in claim 1, including the step (g) of impregnating the porous matrix with catalytic material comprising a noble metal selected from the group consisting of platinum and palladium.

References Cited by the Examiner

UNITED STATES PATENTS

| | | | |
|---|---|---|---|
| 1,549,867 | 8/25 | Graveman | 264—29 |
| 2,000,815 | 5/35 | Berl. | |
| 2,010,608 | 8/35 | Schumacher et al. | |
| 2,529,041 | 11/50 | Muller | 18—54.7 |
| 2,648,637 | 8/53 | Rodman | 252—444 X |
| 2,658,099 | 11/53 | Basset | 136—121 |
| 2,799,053 | 7/57 | Gartland | 18—54.7 |
| 3,077,507 | 2/63 | Kordesch et al. | 136—120 |
| 3,112,208 | 11/63 | Johnson | 136—121 |

FOREIGN PATENTS 1,116,287 11/61 Germany.

JOHN H. MACK, *Primary Examiner.*

JOHN R. SPECK, JOSEPH REBOLD, *Examiners.*